(12) United States Patent
Yamashita et al.

(10) Patent No.: US 9,115,931 B2
(45) Date of Patent: Aug. 25, 2015

(54) AIR-CONDITIONING APPARATUS

(71) Applicant: MITSUBISHI ELECTRIC CORPORATION, Chiyoda-ku (JP)

(72) Inventors: Koji Yamashita, Tokyo (JP); Hiroyuki Morimoto, Tokyo (JP); Yuji Motomura, Tokyo (JP); Takeshi Hatomura, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 14/261,499

(22) Filed: Apr. 25, 2014

(65) Prior Publication Data

US 2014/0230473 A1 Aug. 21, 2014

Related U.S. Application Data

(63) Continuation of application No. 13/056,172, filed as application No. PCT/JP2008/069605 on Oct. 29, 2008, now Pat. No. 8,752,397.

(51) Int. Cl.
*F25D 21/00* (2006.01)
*F25D 21/12* (2006.01)
(Continued)

(52) U.S. Cl.
CPC . *F25D 21/12* (2013.01); *F24F 3/06* (2013.01); *F25B 13/00* (2013.01); *F25B 25/005* (2013.01);
(Continued)

(58) Field of Classification Search
CPC ......... F25D 21/006; F25D 21/12; F25B 5/04; F25B 13/00; F25B 25/005; F25B 47/025; F25B 2313/006; F25B 2313/0233; F25B 2313/0272; F25B 2313/0314; F24F 3/06; F24F 2011/0087; F24F 2313/02741; Y02B 30/745

USPC ........ 62/80, 81, 151, 185, 201, 277, 430, 434
See application file for complete search history.

(56) References Cited

U.S. PATENT DOCUMENTS

| 5,237,833 A | 8/1993 | Hayashida et al. |
| 5,309,733 A | 5/1994 | Hayashida et al. |

(Continued)

FOREIGN PATENT DOCUMENTS

| JP | 60-016283 A | 1/1985 |
| JP | 1-142356 A | 6/1989 |

(Continued)

OTHER PUBLICATIONS

International Search Report (PCT/ISA/210) issued on Jan. 20, 2009, by Japanese Patent Office as the International Searching Authority for International Application No. PCT/JP2008/069605.

(Continued)

*Primary Examiner* — Marc Norman
(74) *Attorney, Agent, or Firm* — Buchanan Ingersoll & Rooney PC

(57) ABSTRACT

In an air-conditioning apparatus, a heat source side heat exchanger, intermediate heat exchangers, and use side heat exchangers are separately formed and adapted to be disposed at separate locations, respectively. There is provided a defrosting operation function to melt frost attached around the heat source side heat exchanger, and a heating function during defrosting operation that drives a pump to circulate a heat medium and supply heating energy to the use side heat exchangers in need of heating to perform heating operation. The defrosting operation function can be executed by switching a four-way valve to cooling side to introduce a high-temperature high-pressure refrigerant flowed out of the compressor into the heat source side heat exchanger.

7 Claims, 8 Drawing Sheets

(51) Int. Cl.
*F24F 3/06* (2006.01)
*F25B 13/00* (2006.01)
*F25B 25/00* (2006.01)
*F25B 47/02* (2006.01)
*F24F 11/00* (2006.01)
*F25B 5/04* (2006.01)

(52) U.S. Cl.
CPC ............ *F25B 47/025* (2013.01); *F25D 21/006* (2013.01); *F24F 2011/0087* (2013.01); *F25B 5/04* (2013.01); *F25B 2313/006* (2013.01); *F25B 2313/0233* (2013.01); *F25B 2313/0272* (2013.01); *F25B 2313/02741* (2013.01); *F25B 2313/0314* (2013.01); *F25B 2600/13* (2013.01); *Y02B 30/745* (2013.01)

(56) References Cited

U.S. PATENT DOCUMENTS

| | | | |
|---|---|---|---|
| 5,388,422 | A | 2/1995 | Hayashida et al. |
| 5,664,421 | A | 9/1997 | Matsue et al. |
| 6,006,528 | A | 12/1999 | Arima et al. |
| 6,170,270 | B1 | 1/2001 | Arshansky et al. |
| 6,467,289 | B2 | 10/2002 | Kuroki et al. |
| 2005/0103033 | A1 | 5/2005 | Schwartz et al. |
| 2012/0042674 | A1* | 2/2012 | Takenaka et al. ................ 62/180 |
| 2012/0204588 | A1* | 8/2012 | Takenaka et al. ............ 62/238.7 |

FOREIGN PATENT DOCUMENTS

| | | | |
|---|---|---|---|
| JP | 3-017475 | A | 1/1991 |
| JP | 5-280818 | A | 10/1993 |
| JP | 6-147702 | A | 5/1994 |
| JP | 8-285350 | A | 11/1996 |
| JP | 8-291951 | A | 11/1996 |
| JP | 9-026188 | A | 1/1997 |
| JP | 2598550 | B2 | 4/1997 |
| JP | 2001-027429 | A | 1/2001 |
| JP | 2002-122334 | A | 4/2002 |
| JP | 2003-343936 | A | 12/2003 |
| JP | 2005-147609 | A | 6/2005 |
| JP | 2006-046692 | A | 2/2006 |
| JP | 2006-145098 | A | 6/2006 |
| WO | WO 97/11317 | A1 | 3/1997 |

OTHER PUBLICATIONS

Japanese Office Action (Notice of Reason for Rejection) dated Oct. 2, 2012, issued by the Japanese Patent Office corresponding to Japanese Application No. 2010-535545 with English language translation (7 pages).

Office Action dated Dec. 20, 2012, issued in corresponding Chinese Patent Application No. 200880130554.6 with English language translation (7 pages).

* cited by examiner

AIR-CONDITIONING APPARATUS

CROSS-REFERENCE TO RELATED APPLICATIONS

This application is a continuation of prior application Ser. No. 13/056,172 filed Mar. 29, 2011, which is a National Stage of Application No. PCT/JP2008/069605 filed Oct. 29, 2008, the entire contents of each of which are incorporated by reference herein.

TECHNICAL FIELD

The present invention relates to an air-conditioning apparatus such as a multiple air conditioner for buildings.

BACKGROUND ART

In a multiple air conditioner, which is a conventional air-conditioning apparatus, cooling energy or heating energy is delivered indoors by circulating a refrigerant between an outdoor unit, which is a heat source apparatus installed outdoors, and an indoor unit installed indoors. As for the refrigerant, an HFC (hydrofluorocarbon) refrigerant is mainly used and the air-conditioning apparatus using a natural refrigerant such as $CO_2$ is proposed.

In a chiller, which is another conventional air-conditioning apparatus, cooling energy or heating energy is generated in a heat source apparatus disposed outdoors, cooling energy or heating energy is transferred to a heat medium such as water and an anti-freezing liquid at a heat exchanger disposed in an outdoor unit, and cooling operation or heating operation is performed by carrying the heat medium to a fan coil unit, a panel heater and the like, which are of an indoor unit (Refer to Patent Literature 1, for example).

Patent Literature 1: Japanese Unexamined Patent Application Publication No. 2003-343936

SUMMARY OF INVENTION

Technical Problem

In the conventional air-conditioning apparatus, since a refrigerant is circulated directly in an indoor unit, heating energy can be supplied to the indoor unit during defrosting operation, causing to lower the room temperature while defrosting. Further, since no heating operation is possible while defrosting, system efficiency is lowered including defrosting. A chiller performs heat exchange between the refrigerant and water outdoors to convey water, therefore, carrying power of water is extremely large, and even when heating energy can be supplied during defrosting operation, the system efficiency including defrosting is deteriorated because of a large amount of carrying power of the pump, causing a problem of non-energy saving.

The present invention is made to solve the above-mentioned problems and its object is to obtain an air-conditioning apparatus capable of suppressing the lowering of the indoor temperature and reducing power necessary for circulating a secondary heat medium by circulating the secondary heat medium in the indoor unit during defrosting operation.

Solution to Problem

The air-conditioning apparatus according to the present invention includes:

intermediate heat exchangers for heating and cooling a heat medium that exchanges heat between a refrigerant and the heat medium different from the refrigerant;

a refrigeration cycle in which a compressor, a four-way valve that switches the outlet-side flow path of the compressor between at heating operation and at cooling operation, a heat source side heat exchanger, at least one expansion valve and a refrigerant-side flow paths of the intermediate heat exchanger are connected via piping through which the refrigerant flows, and a heat medium circulation circuit in which a heat medium side flow path of the intermediate heat exchanger, a pump, and a use side heat exchanger are connected via piping through which the heat medium flows.

The heat source side heat exchanger, the intermediate heat exchangers, and the use side heat exchanger are separately formed respectively and adapted to be disposed at separate locations from each other.

The air-conditioning apparatus is provided with a defrosting operation function to melt frost attached around the heat source side heat exchanger, and a heating function during defrosting operation that drives the pump to circulate the heat medium while operating the defrosting operation function and supply heating energy to the use side heat exchanger in need of heating to perform heating operation.

The defrosting operation function can be executed by switching the four-way valve to the cooling side to introduce a high-temperature high-pressure refrigerant into the heat source side heat exchanger.

Advantageous Effects of Invention

In the air-conditioning apparatus according to the present invention, since a refrigeration cycle having a heat source side heat exchanger and a heat medium circulation circuit supplying heating energy to a use side heat exchanger are separated, heating energy can be continuously supplied for a certain period so as to heat indoors even when being switched from heating operation to defrosting operation. The heat source side heat exchanger, the intermediate heat exchangers, and the use side heat exchanger are separately formed respectively, and are adapted to be disposed at separate locations from each other, therefore, carrying power of the heat medium can be made small, and system efficiency including defrosting being improved to contribute to energy saving.

Figure 1:
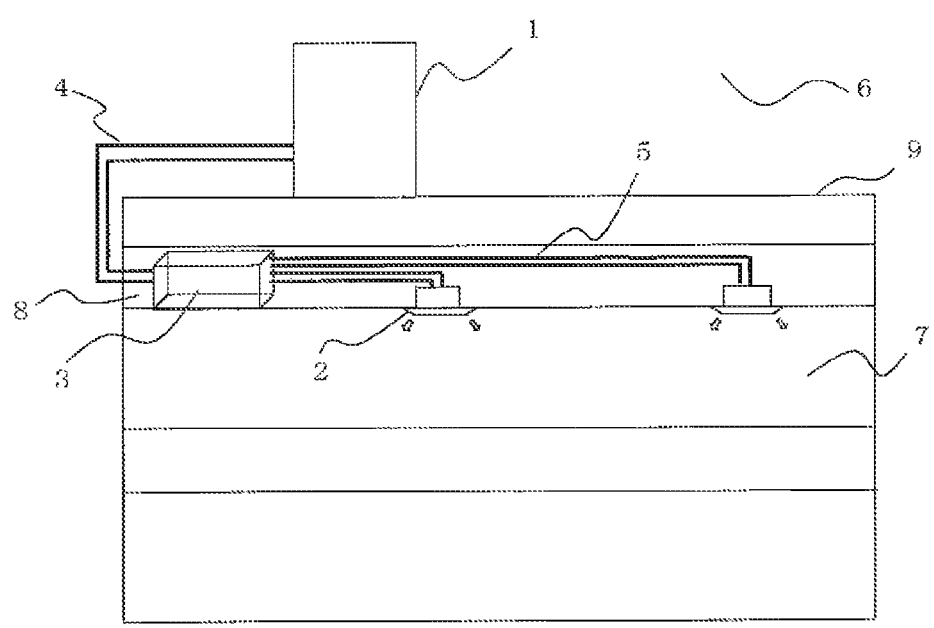
FIG. 1 is an entire constitution diagram of an air-conditioning apparatus according to Embodiment 1 of the present invention.

1 heat source apparatus (outdoor unit)
2 indoor unit
3 relay unit
3a main relay unit
3b(1), 3b(2) sub relay unit
4 refrigerant pipeline
5 heat medium pipeline
6 outdoor space
7 indoor space
8 non-air conditioned space
9 structures such as building
10 compressor
11 four-way valve
12 heat source side heat exchanger
13a, 13b, 13c, 13d check valve
14 gas-liquid separator
15a, 15b intermediate heat exchanger
16a, 16b, 16c, 16d, 16e expansion valve
17 accumulator
21a, 21b pump
22a, 22b, 22c, 22d flow path switching valve
23a, 23b, 23c, 23d flow path switching valve
24a, 24b, 24c stop valve
25a, 25b, 25c, 25d flow amount adjustment valve
26a, 26b, 26c, 26d use side heat exchanger
27a, 27b, 27c, 27d bypass
31a, 31b first temperature sensor
32a, 32b second temperature sensor
33a, 33b, 33c, 33d third temperature sensor
34a, 34b, 34c, 34d fourth temperature sensor
35 fifth temperature sensor
36 pressure sensor
37 sixth temperature sensor
38 seventh temperature sensor

DESCRIPTION OF EMBODIMENTS

Detailed descriptions will be given to embodiments of the present invention.

Embodiment 1

Figure 2:
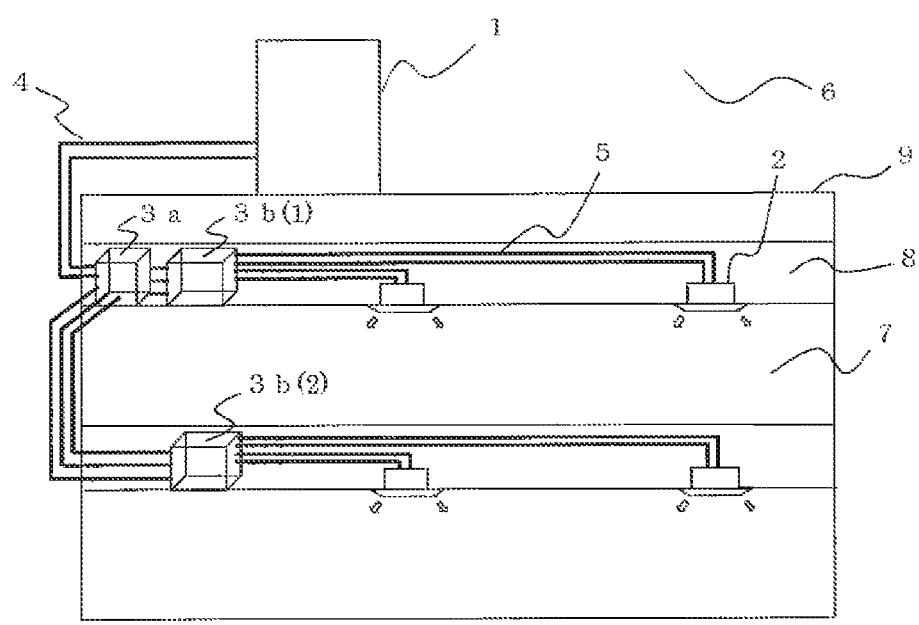
FIG. 2 is another entire constitution diagram of the air-conditioning apparatus according to Embodiment 1 of the present invention.

FIGS. 1 and 2 are an entire constitution diagram of an air-conditioning apparatus according to Embodiment 1 of the present invention. The air-conditioning apparatus includes a heat source apparatus (outdoor unit) 1, an indoor unit 2 subjected to air conditioning of indoors, and a relay unit 3 that is separated from the outdoor unit 1 to be disposed in a non-air conditioned space 8. The heat source apparatus 1 and the relay unit 3 are connected by refrigerant pipeline 4 and a refrigerant (a primary medium) flows therein. The relay unit 3 and the indoor unit 2 are connected by heat medium pipeline 5 and a heat medium (a secondary medium) such as water and an anti-freezing liquid flows therein. The relay unit 3 performs heat exchange between the refrigerant sent from the heat source apparatus 1 and the heat medium sent from the indoor unit 2.

The heat source apparatus 1 is usually disposed in an outdoor space 6, which is an external space of structures such as building 9. The indoor unit 2 is disposed at a position capable of carrying heated or cooled air to an indoor space 7 such as a living room inside of structures such as building 9. The relay unit 3 is housed in a different housing from the heat source apparatus 1 and the indoor unit 2, being connected by the refrigerant pipeline 4 and the heat medium pipeline 5, and being adapted to be capable of being disposed at a different location from the outdoor space 6 and the indoor space 7. In FIG. 1, the relay unit 3 is inside the building 9, however, being disposed in a non-air conditioned space 8 such as under the roof, which is a different space from the indoor space 7. The relay unit 3 can be disposed in a place such as a common use space having an elevator or the like.

The heat source apparatus 1 and the relay unit 3 are configured so as to be connected using two refrigerant pipelines 4. The relay unit 3 and each indoor unit 2 are connected using two heat medium pipelines 5 respectively. Connection using two pipes facilitates the construction of the air-conditioning apparatus.

FIG. 2 shows a case where a plurality of relay units 3 are provided. That is, the relay unit 3 is divided into one main relay unit 3a and two sub relay units 3b(1) and 3b(2) derived therefrom. Accordingly, a plurality of sub relay units 3b can be connected with one main relay unit 3a. In this configuration, there are three connection pipelines between the main relay unit 3a and the sub relay units 3b.

In FIGS. 1 and 2, the indoor unit 2 is shown with a ceiling cassette type being an example, however, it is not limited thereto. Any type such as a ceiling-concealed type and a ceiling-suspended type will be allowable as long as heated or cooled air can be blown out into the indoor space 7 directly or through a duct or the like.

The heat source apparatus 1 is explained with the case of being disposed in the outdoor space 6 outside the building 9 as an example, however, it is not limited thereto. For example, the heat source apparatus 1 may be disposed in a surrounded space like a machine room near a ventilating opening. The heat source apparatus 1 may be disposed inside the building 9 to discharge exhaust heat to outside of the building 9 through an exhaust duct. A water-cooled type heat source apparatus may be employed to be disposed in the building 9.

The relay unit 3 may be disposed near the heat source apparatus 1, which may be against energy saving.

Figure 3:
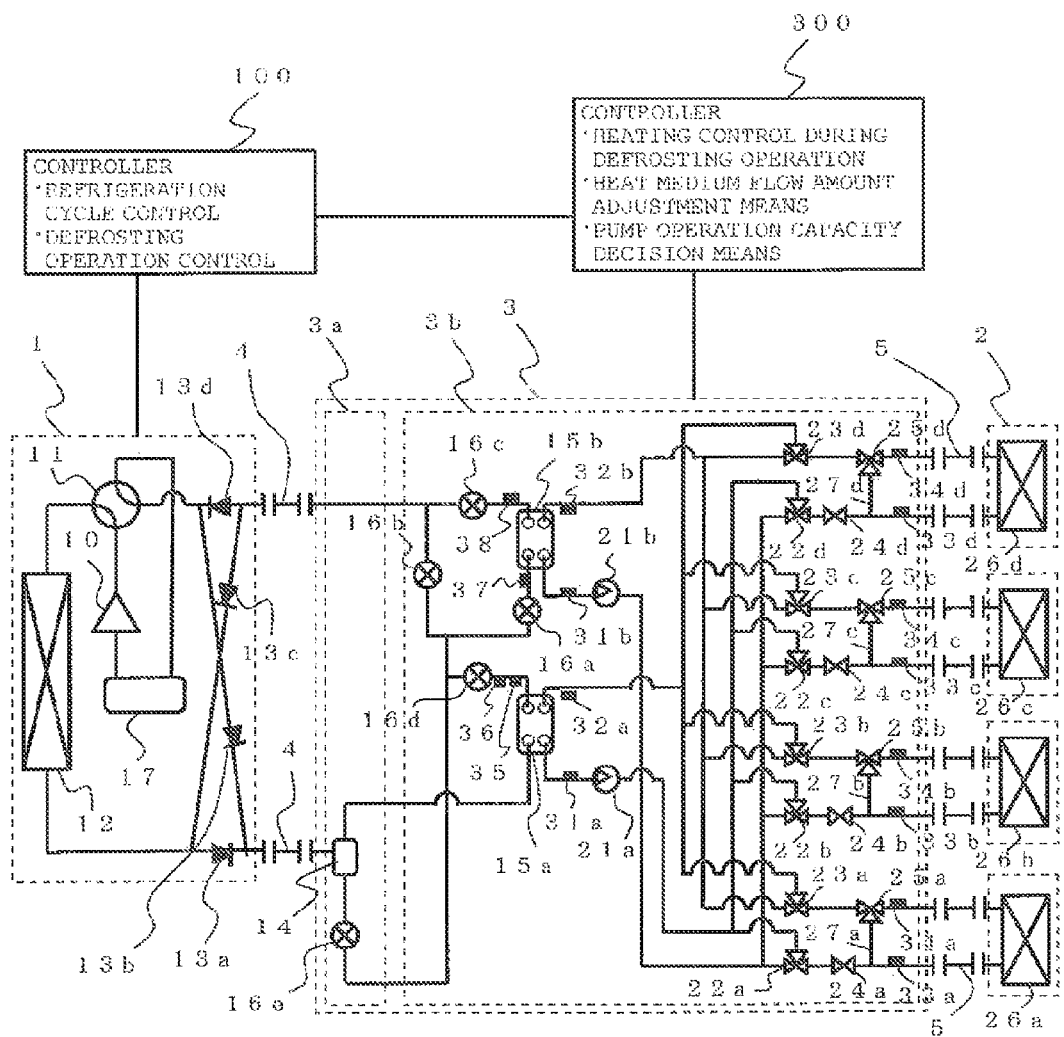
FIG. 3 is a circuit diagram for a refrigerant and a heat medium of the air-conditioning apparatus according to Embodiment 1 of the present invention.

Next, descriptions will be given to detailed configuration of the above air-conditioning apparatus. FIG. 3 is a circuit diagram for the refrigerant and the heat medium of the air-conditioning apparatus according to Embodiment 1 of the present invention. The air-conditioning apparatus, as shown in FIG. 3, has a heat source apparatus 1, an indoor unit 2, and a relay unit 3.

The heat source apparatus 1 includes a compressor 10, a four-way valve 11, a heat source side heat exchanger 12, check valves 13a, 13b, 13c and 13d, and an accumulator 17. The indoor unit 2 includes use side heat exchangers 26a to 26d. The relay unit 3 includes a main relay unit 3a and a sub relay unit 3b. The main relay unit 3a includes a gas-liquid separator 14 to separate a gas phase and a liquid phase of the refrigerant and an expansion valve 16e (an electronic expansion valve, for example).

The sub relay unit 3b includes intermediate heat exchangers 15a and 15b, expansion valves (electronic expansion valves, for example) 16a to 16d, pumps 21a and 21b, and flow path switching valves 22a to 22d and 23a to 23d such as a three-way valve. The flow path switching valves are installed at inlet side flow paths and outlet side flow paths of each use side heat exchanger 26a to 26d, correspondingly. The flow path switching valves 22a to 22d switch outlet side flow paths among plurally disposed intermediate heat exchangers. The flow path switching valves 23a to 23d switch inlet side flow paths among them. In this example, the flow path switching valves 22a to 22d perform operations to switch outlet side flow paths between the intermediate heat exchangers 15a and 15b, and the flow path switching valves 23a to 23d perform operations to switch inlet side flow paths between the intermediate heat exchangers 15a and 15b.

At inlet sides of use side heat exchangers 26a to 26d, stop valves 24a to 24d for opening and closing flow paths are provided, and at outlet sides thereof, flow amount adjustment valves 25a to 25d for adjusting flow amount are provided, respectively. The inlet side flow path and the outlet side flow path of each use side heat exchanger 26a to 26d are connected by bypasses 27a to 27d via flow amount adjustment valves 25a to 25d.

The sub relay unit 3b includes temperature sensors and pressure sensors as follows:

the temperature sensors (first temperature sensors) 31a and 31b to detect the outlet temperature of the heat medium of the intermediate heat exchangers 15a and 15b;

the temperature sensors (second temperature sensors) 32a and 32b to detect the inlet temperature of the heat medium of the intermediate heat exchangers 15a and 15b;

the temperature sensors (third temperature sensors) 33a to 33d to detect the inlet temperature of the heat medium of the use side heat exchangers 26a to 26d;

the temperature sensors (fourth temperature sensors) 34a to 34d to detect the outlet temperature of the heat medium of the use side heat exchangers 26a to 26d;

the temperature sensor (a fifth temperature sensor) 35 to detect the refrigerant outlet temperature of the intermediate heat exchanger 15a;

the pressure sensor 36 to detect the refrigerant outlet pressure of the intermediate heat exchanger 15a;

the temperature sensor (a sixth temperature sensor) 37 to detect the refrigerant inlet temperature of the intermediate heat exchanger 15b; and the temperature sensor (a seventh temperature sensor) 38 to detect the refrigerant outlet temperature of the intermediate heat exchanger 15b.

These temperature sensors and pressure sensors can employ a variety of thermometers, temperature sensors, pressure gauge, and pressure sensors.

The compressor 10, the four-way valve 11, the heat source side heat exchanger 12, the check valves 13a, 13b, 13c and 13d, the gas-liquid separator 14, the expansion valves 16a to 16e, the intermediate heat exchangers 15a and 15b, and the accumulator 17 configure a refrigeration cycle.

The intermediate heat exchanger 15a, the pump 21a, the flow path switching valves 22a to 22d, the stop valves 24a to 24d, the use side heat exchangers 26a to 26d, the flow amount adjustment valves 25a to 25d, and the flow path switching valves 23a to 23d configure a heat medium circulation circuit. In the same way, the intermediate heat exchanger 15b, the pump 21b, the flow path switching valves 22a to 22d, the stop valves 24a to 24d, the use side heat exchangers 26a to 26d, the flow amount adjustment valves 25a to 25d, and the flow path switching valves 23a to 23d configure a heat medium circulation circuit.

As shown in figures, each of use side heat exchangers 26a to 26d is provided with the intermediate heat exchangers 15a and 15b in parallel in plural, each configuring the heat medium circulation circuit.

In the heat source apparatus 1, a controller 100 is provided that controls equipment constituting thereof to make the heat source apparatus 1 to perform operations as what is called an outdoor unit. In the relay unit 3, a controller 300 is provided that controls equipment constituting thereof and has means to perform functions and operations to be mentioned later. These controllers 100 and 300 are composed of such as microcomputers to be communicably connected with each other. Next, operations of each operation mode of the above air-conditioning apparatus will be explained.

<Cooling Only Operation>

Figure 4:
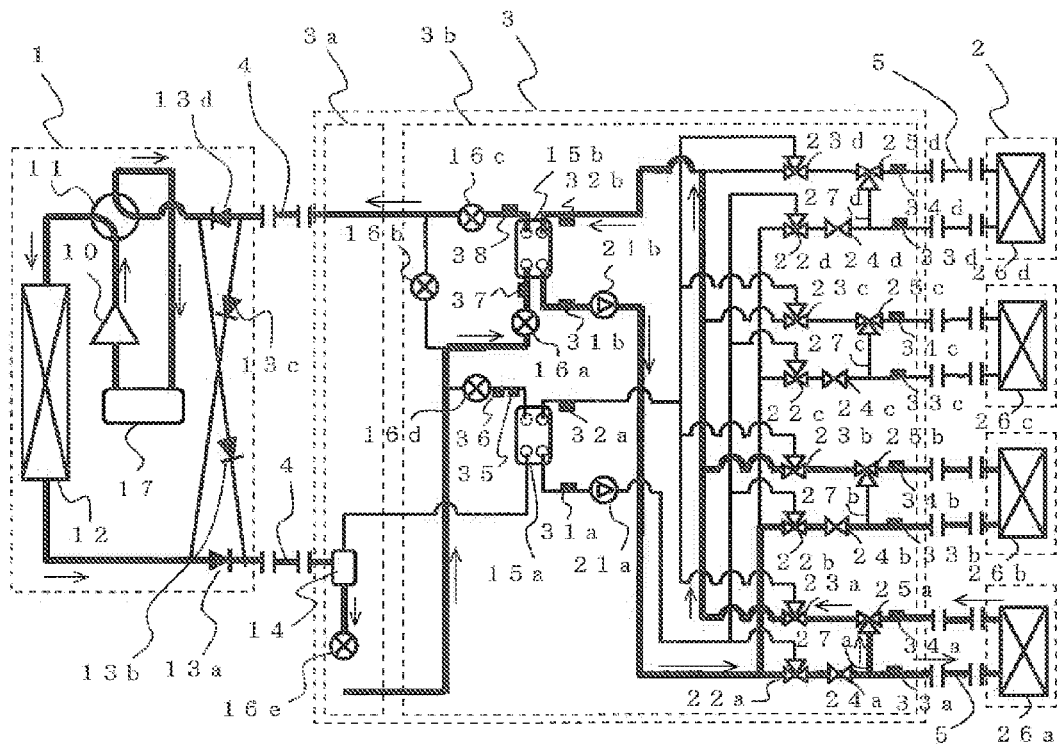
FIG. 4 is a circuit diagram showing the refrigerant and the heat medium flows at the time of cooling only operation.

FIG. 4 is a circuit diagram showing a refrigerant and a heat medium flows at the time of cooling only operation. In the cooling only operation, the refrigerant is compressed by the compressor 10, turned into a high-temperature high-pressure gas refrigerant to enter the heat source side heat exchanger 12 via the four-way valve 11. The refrigerant is condensed and liquefied there, passes through the check valve 13a, and flowed out of the heat source apparatus 1 into the relay unit 3 via the refrigerant pipeline 4. In the relay unit 3, the refrigerant enters the gas-liquid separator 14 to be guided into the intermediate heat exchanger 15b via the expansion valves 16e and 16a. Thereby, the refrigerant is expanded by the expansion valve 16a to turn into a low-temperature low-pressure two-phase refrigerant and the intermediate heat exchanger 15b operates as an evaporator. The refrigerant turns into a low-temperature low-pressure gas refrigerant in the intermediate heat exchanger 15b and flows out of the relay unit 3 via the expansion valve 16c to flow into the heat source apparatus 1 again via the refrigerant pipeline 4. In the heat source apparatus 1, the refrigerant passes through the check valve 13d to be sucked into the compressor 10 via the four-way valve 11 and the accumulator 17. Then, the expansion valves 16b and 16d have an opening-degree small enough for the refrigerant not to flow and the expansion valve 16c is made to be a full-open state so as not to cause a pressure loss.

Next, descriptions will be given to movement of the secondary side heat medium (water, anti-freezing liquid, etc.) In intermediate heat exchanger 15b, cooling energy of the refrigerant on the primary side is transferred to the heat medium on the secondary side, and the cooled heat medium is made to flow in the secondary side piping by the pump 21b. The heat medium flowed out of the pump 21b passes through the stop valves 24a to 24d via the flow path switching valves 22a to 22d to flow into the use side heat exchangers 26a to 26d and the flow amount adjustment valves 25a to 25d. Then, through the operation of the flow amount adjustment valves 25a to 25d, only the heat medium having a flow amount necessary to cover the air-conditioning load required indoors is made to flow into the use side heat exchangers 26a to 26d, and the remaining passes through the bypasses 27a to 27d to make no contribution to heat exchange. The heat medium passing through the bypasses 27a to 27d merges with the heat medium passing through the use side heat exchangers 26a to 26d, passes through the flow path switching valves 23a to 23d, and flows into the intermediate heat exchanger 15b to be sucked again into the pump 21b. The air-conditioning load required indoors can be covered by controlling a difference between the detection temperatures of the third temperature sensors 33a to 33d and the fourth temperature sensors 34a to 34d to maintain a predetermined target value.

Since there is no need to flow the heat medium to the use side heat exchanger (including thermo-off) having no air-conditioning load, the flow path is closed by the stop valves 24a to 24d and the heat medium is made not to flow into the use side heat exchanger. In FIG. 4, while in the use side heat exchangers 26a and 26b, the heat medium is made to flow because of an air-conditioning load, in the use side heat exchangers 26c and 26d, there is no air-conditioning load and corresponding stop valves 24c and 24d are closed.

<Heating Only Operation>

Figure 5:
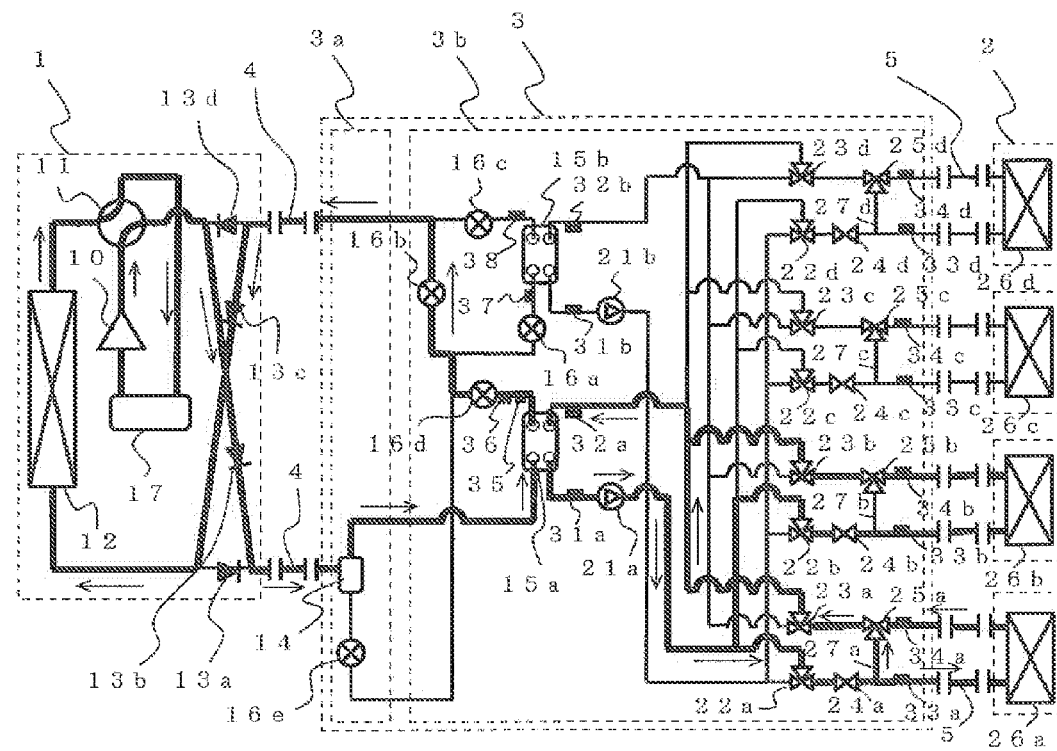
FIG. 5 is a circuit diagram showing the refrigerant and the heat medium flows at the time of heating only operation.

FIG. 5 is a circuit diagram showing a refrigerant and a heat medium flows at the time of heating only operation. In the heating only operation, the refrigerant is compressed by the compressor 10, turns into a high-temperature high-pressure gas refrigerant, passes through the check valve 13b via the four-way valve 11, and flows out of the heat source apparatus 1 via the check valve 13b to flow into the relay unit 3 via the refrigerant pipeline 4. In the relay unit 3, the refrigerant is guided into the intermediate heat exchanger 15a through the gas-liquid separator 14, condensed and liquefied in the intermediate heat exchanger 15a to flow out of the relay unit 3 through the expansion valves 16d and 16b. Thereby, the refrigerant is expanded by the expansion valve 16b, turned into a low-temperature low-pressure two-phase refrigerant, and flows into the heat source apparatus 1 again through the refrigerant pipeline 4. In the heat source apparatus 1, the refrigerant is guided into the heat source side heat exchanger 12 through the check valve 13c and the heat source side heat exchanger 12 operates as an evaporator. The refrigerant turns into a low-temperature low-pressure gas refrigerant there to be sucked into the compressor 10 via the four-way valve 11 and the accumulator 17. Thereby, the expansion valve 16e and the expansion valve 16a or 16c are made to have a small opening-degree so that no refrigerant flows therethrough.

Next, movement of the secondary side heat medium (water, anti-freezing liquid, etc.) will be explained. In the intermediate heat exchanger 15a, heating energy of the primary side refrigerant is transferred to the secondary side heat medium and the heated heat medium is made to flow in the secondary side piping by the pump 21a. The heat medium flowed out of the pump 21a passes through the stop valves 24a to 24d via the flow path switching valves 22a to 22d to flow into the use side heat exchangers 26a to 26d and the flow amount adjustment valves 25a to 25d. Then, through the operation of the flow amount adjustment valves 25a to 25d, only the heat medium having a flow amount necessary to cover the air-conditioning load required indoors is made to flow into the use side heat exchangers 26a to 26d, and the remaining passes through the bypasses 27a to 27d to make no contribution to heat exchange. The heat medium passing through the bypasses 27a to 27d merges with the heat medium passing through the use side heat exchangers 26a to 26d, passes through the flow path switching valves 23a to 23d, and flows into the intermediate heat exchanger 15a to be sucked again into the pump 21a. The air-conditioning load required indoors can be covered by controlling a difference between the detection temperatures of the third temperature sensors 33a to 33d and the fourth temperature sensors 34a to 34d to maintain a target value.

Since there is no need to flow the heat medium to the use side heat exchanger (including thermo-off) having no air-conditioning load, the flow path is closed by the stop valves 24a to 24d and the heat medium is made not to flow into the use side heat exchanger. In FIG. 5, while in the use side heat exchangers 26a and 26b, the heat medium is made to flow because of an air-conditioning load, in the use side heat exchangers 26c and 26d there is no air-conditioning load and corresponding stop valves 24c and 24d are closed.

<Cooling-Main Operation>

Figure 6:
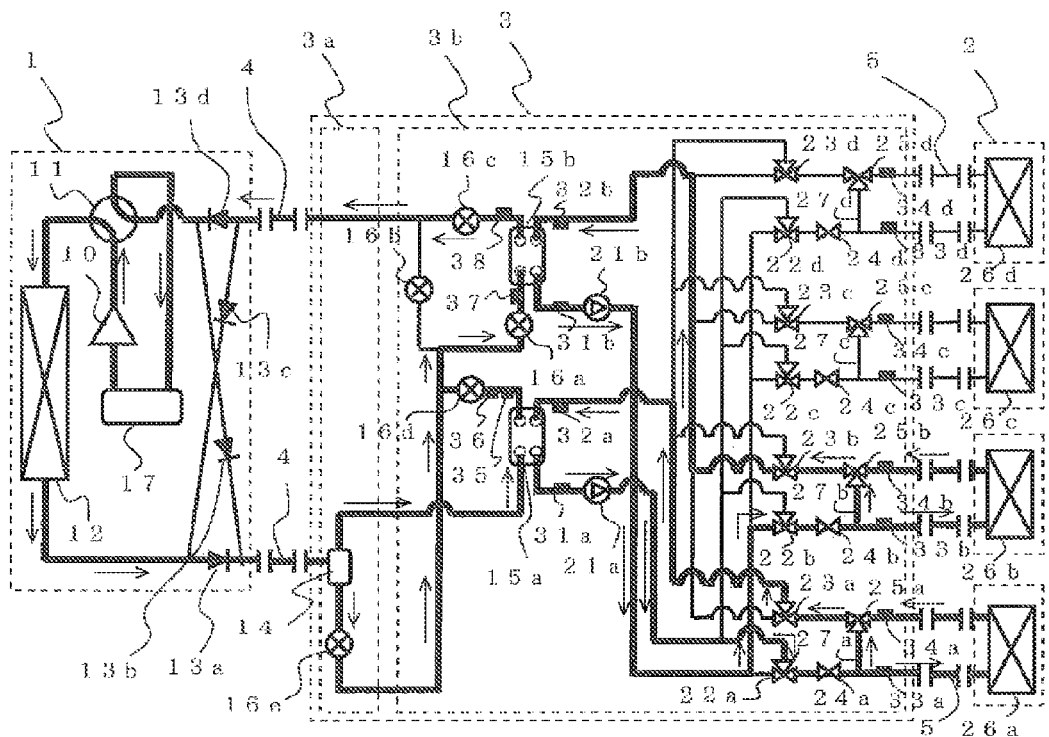
FIG. 6 is a circuit diagram showing the refrigerant and the heat medium flows at the time of cooling-main operation.

FIG. 6 is a circuit diagram showing a refrigerant and a heat medium flows at the time of cooling-main operation. In the cooling-main operation, the refrigerant is compressed by the compressor 10, turned into a high-temperature high-pressure gas refrigerant to be guided into the heat source side heat exchanger 12 via the four-way valve 11. There, a gas-state refrigerant is condensed to turn into a two-phase refrigerant, flows out of the heat source side heat exchanger 12 in the two-phase state, flows out of the heat source apparatus 1 via the check valve 13a, and flows into the relay unit 3 via the refrigerant pipeline 4. In the relay unit 3, the refrigerant enters the gas-liquid separator 14 and a gas refrigerant and a liquid refrigerant in the two-phase refrigerant are separated into. The gas refrigerant is guided into the intermediate heat exchanger 15a, condensed and liquefied therein to pass through the expansion valve 16d. Meanwhile, the liquid refrigerant separated in the gas-liquid separator 14 is flowed to the expansion valve 16e, joined with the liquid refrigerant condensed and liquefied in the intermediate heat exchanger 15a and passing through the expansion valve 16d, and guided to the intermediate heat exchanger 15b via the expansion valve 16a. Then, the refrigerant is expanded by the expansion valve 16a to turn into a low-temperature low-pressure two-phase refrigerant and the intermediate heat exchanger 15b operates as an evaporator. The refrigerant turns into a low-temperature low-pressure gas refrigerant in the intermediate heat exchanger 15b and flows out of the relay unit 3 via the expansion valve 16c to flow into the heat source apparatus 1 again via the refrigerant pipeline 4. In the heat source apparatus 1, the refrigerant passes through the check valve 13d to be sucked into the compressor 10 via the four-way valve 11 and the accumulator 17. Then, the expansion valves 16b has an opening-degree small enough for the refrigerant not to flow and the expansion valve 16c is made to be a full open state so as not to cause a pressure loss.

Next, descriptions will be given to movement of the secondary side heat medium (water, anti-freezing liquid, etc.) In the intermediate heat exchanger 15a, heating energy of the refrigerant on the primary side is transferred to the heat medium on the secondary side, and the heated heat medium is made to flow in the secondary side piping by the pump 21a. In the intermediate heat exchanger 15b, cooling energy of the refrigerant on the primary side is transferred to the heat medium on the secondary side, and the cooled heat medium is made to flow in the secondary side piping by the pump 21b. The heat medium flowed out of the pumps 21a and 21b passes through the stop valves 24a to 24d via the flow path switching valves 22a to 22d to flow into the use side heat exchangers 26a to 26d and the flow amount adjustment valves 25a to 25d. Then, through the operation of the flow amount adjustment valves 25a to 25d, only the heat medium having a flow amount necessary to cover the air-conditioning load required indoors is made to flow into the use side heat exchangers 26a to 26d, and the remaining passes through the bypasses 27a to 27d to make no contribution to heat exchange. The heat medium passing through the bypasses 27a to 27d merges with the heat medium passing through the use side heat exchangers 26a to 26d, and passes through the flow path switching valves 23a to 23d. The heated heat medium flows into the intermediate heat exchanger 15a to return to the pump 21a again, and the cooled heat medium flows into the intermediate heat exchanger 15b to return to the pump 21b again, respectively. Meanwhile, the heated heat medium and the cooled heat medium are guided to the use side heat exchangers 26a to 26d having the heating load and the cooling load, respectively, without being mixed through the operation of the flow path switching valves 22a to 22d and 23a to 23d. The air-conditioning load required indoors can be covered by controlling a difference between the detection temperatures of the third temperature sensors 33a to 33d and the fourth temperature sensors 34a to 34d to maintain a target value.

FIG. 6 shows a state in which a heating load is generated in the use side heat exchanger 26a and a cooling load is generated in the use side heat exchanger 26b, respectively.

Since there is no need to flow the heat medium to the use side heat exchanger (including thermo-off) having no air-conditioning load, the flow path is closed by the stop valves 24a to 24d and the heat medium is made not to flow into the use side heat exchanger. In FIG. 6, while in the use side heat exchangers 26a and 26b, the heat medium is made to flow because of an air-conditioning load, in the use side heat exchangers 26c and 26d, there is no air-conditioning load and corresponding stop valves 24c and 24d are closed.

<Heating-Main Operation>

Figure 7:
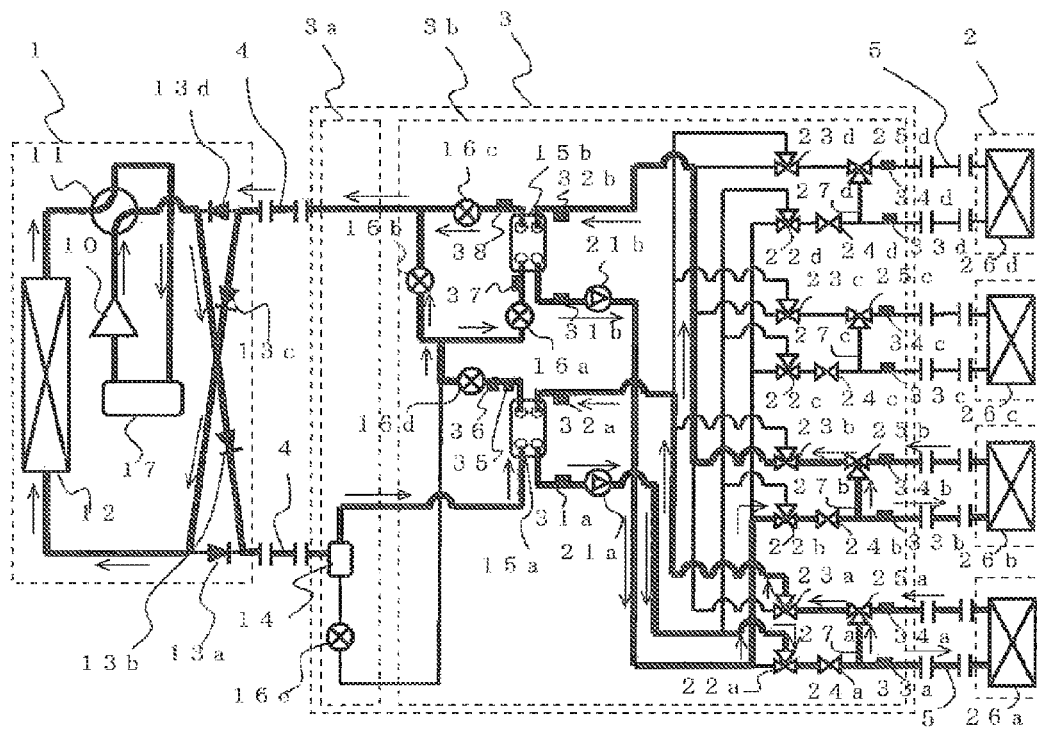
FIG. 7 is a circuit diagram showing the refrigerant and the heat medium flows at the time of heating-main operation.

FIG. 7 is a circuit diagram showing a refrigerant and a heat medium flows at the time of heating-main operation. In the heating-main operation, the refrigerant is compressed by the compressor 10, turns into a high-temperature high-pressure gas refrigerant, passes through the check valve 13b via the four-way valve 11, and flows out of the heat source apparatus 1 to flow into the relay unit 3 via the refrigerant pipeline 4. In the relay unit 3, the refrigerant is introduced into the intermediate heat exchanger 15a through the gas-liquid separator 14, and condensed and liquefied in the intermediate heat exchanger 15a. Thereafter, the refrigerant passing through the expansion valve 16d is branched into flow paths through the expansion valves 16a and 16b. The refrigerant passing through the expansion valve 16a is expanded by the expansion valve 16a to turn into a low-temperature low-pressure two-phase refrigerant and flows into the intermediate heat exchanger 15b. The intermediate heat exchanger 15b operates as an evaporator. The refrigerant flowed out of the intermediate heat exchanger 15b evaporates to turn into a gas refrigerant and passes through the expansion valve 16c. On the other hand, the refrigerant passing through the expansion valve 16b is expanded by the expansion valve 16b to turn into a low-temperature low-pressure two-phase refrigerant, and merges with the refrigerant passing through the intermediate heat exchanger 15b and the expansion valve 16c to turn into a low-temperature low-pressure refrigerant having larger dryness. Then, the merged refrigerant flows out of the relay unit 3 to flow into the heat source apparatus 1 again through the refrigerant pipeline 4. In the heat source apparatus 1, the refrigerant passes through the check valve 13c to be guided into the heat source side heat exchanger 12. The heat source side heat exchanger 12 operates as an evaporator. Then, the low-temperature low-pressure two-phase refrigerant is evaporated into a gas refrigerant and sucked into the compressor 10 via the four-way valve 11 and the accumulator 17. Then, the expansion valve 16e is made to have a small opening-degree so that no refrigerant flows.

Next, movement of the secondary side heat medium (water, anti-freezing liquid, etc.) will be explained. In the intermediate heat exchanger 15a, heating energy of the primary side refrigerant is transferred to the secondary side heat medium and the heated heat medium is made to flow in the secondary side piping by the pump 21a. In the intermediate heat exchanger 15b, cooling energy of the primary side refrigerant is transferred to the secondary side heat medium and the cooled heat medium is made to flow in the secondary side piping by the pump 21b. Then, the heat medium flowed out of the pumps 21a and 21b passes through the stop valves 24a to 24d via the flow path switching valves 22a to 22d to flow into the use side heat exchangers 26a to 26d and flow amount adjustment valves 25a to 25d. Then, through the operation of the flow amount adjustment valves 25a to 25d, only the heat medium having a flow amount necessary to cover the air-conditioning load required indoors is made to flow into the use side heat exchangers 26a to 26d, and the remaining passes through the bypasses 27a to 27d to make no contribution to heat exchange. The heat medium passing through the bypasses 27a to 27d merges with the heat medium passing through the use side heat exchangers 26a to 26d, passes through the flow path switching valves 23a to 23d. The heated heat medium flows into the intermediate heat exchanger 15a to return to the pump 21a again, and the cooled heat medium flows into the intermediate heat exchanger 15b to return to the pump 21b again. Meanwhile, the heated heat medium and the cooled heat medium are guided to the use side heat exchangers 26a to 26d having the heating load and the cooling load, respectively, without being mixed through the operation of the flow path switching valves 22a to 22d and 23a to 23d. The air-conditioning load required indoors can be covered by controlling a difference between the detection temperatures of the third temperature sensors 33a to 33d and the fourth temperature sensors 34a to 34d to maintain a target value.

FIG. 7 shows a state in which a heating load is generated in the use side heat exchanger 26a and a cooling load is generated in the use side heat exchanger 26b, respectively.

Since there is no need to flow the heat medium to the use side heat exchanger (including thermo-off) having no air-conditioning load, the flow path is closed by the stop valves 24a to 24d and the heat medium is made not to flow into the use side heat exchanger. In FIG. 7, while in the use side heat exchangers 26a and 26b, the heat medium is made to flow because of an air-conditioning load, in the use side heat exchangers 26c and 26d, there is no air-conditioning load and corresponding stop valves 24c and 24d are closed.

As mentioned above, heating operation and cooling operation can be freely performed in each indoor unit 2 by switching the corresponding flow path switching valves 22a to 22d and 23a to 23d to the flow path connected to the intermediate heat exchanger 15a for heating when heating load is generated in the use side heat exchangers 26a to 26d, and by switching the corresponding flow path switching valves 22a to 22d and 23a to 23d to the flow path connected to the intermediate heat exchanger 15b for cooling when cooling load is generated in the use side heat exchangers 26a to 26d.

The flow path switching valves 22a to 22d and 23a to 23d may be any that can switch flow paths such as a combination of a three-way valve to switch three-way flow paths and a stop valve to open/close two-way flow paths. The flow path switching valve may be configured by a combination of a stepping-motor-driven mixing valve to change the flow amount of three-way flow paths and an electronic expansion valve to change the flow amount of two-way flow paths. In that case, water hammer can be prevented by a sudden opening/closing of the flow path.

The air-conditioning load in the use side heat exchangers 26a to 26d is expressed by formula 1 as follows, being obtained by multiplying the flow rate, the density, the constant pressure specific heat of the heat medium and the difference in temperature of the heat medium at the inlet and at the outlet of the use side heat exchangers 26a to 26d. Here, Vw denotes the flow amount of the heat medium, ρw the density of the heat medium, Cpw the constant pressure specific heat of the heat medium, Tw the temperature of the heat medium, suffix "in" the value at the inlet of the heat medium of the use side heat exchangers 26a to 26d, suffix "out" the value at the outlet of the heat medium of the use side heat exchangers 26a to 26d, respectively.

Formula 1

$$Q=V_w*(\rho_{win}*Cp_{win}*T_{win}-\rho_{wout}*Cp_{wout}*T_{wout}) \sim V_w*\rho_w*Cp_w*(T_{win}-T_{wout}) \quad (1)$$

When the flow amount of the heat medium flowing to the use side heat exchangers 26a to 26d is fixed, the temperature difference of the heat medium at the inlet and outlet changes according to the change of the air-conditioning load in the use side heat exchangers 26a to 26d. Therefore, the temperature difference at the inlet and outlet of the use side heat exchanger 26a to 26d is set to be a temporary target and it is possible to flow surplus heat medium to the bypasses 27a to 27d to control the flow amount that flows to the use side heat exchangers 26a to 26d by controlling the flow amount adjustment valves 25a to 25d so that the temporary target approaches a predetermined target value. The target value of the temperature difference at the inlet and outlet of the use side heat exchangers 26a to 26d may be set at, for example, 5 degrees C. The operation is performed by the controller 300. Detailed explanations will be given later.

In FIGS. 3 to 7, descriptions are given to the case where the flow amount adjustment valves 25a to 25d are a mixing valve installed at the downstream side of the use side heat exchangers 26a to 26d, however, a three-way valve is allowable installed at the upstream side of the use side heat exchangers 26a to 26d.

Then, the heat medium that exchanged heat in the use side heat exchangers 26a to 26d and heat medium that passed through bypasses 27a to 27d with no heat exchange and no change in temperature merge at a merged section thereafter. The following formula (2) holds in the merged section. Here, Twin and Twout denote inlet and outlet heat medium temperatures of the use side heat exchangers 26a to 26d, Vw the flow amount of the heat medium flowing into the flow amount adjustment valves 25a to 25d, Vwr the flow amount of the heat medium flowing into the use side heat exchangers 26a to 26d, Tw the temperature of the heat medium after the heat medium flowing through the use side heat exchangers 26a to 26d and the heat medium flowing through the bypasses 27a to 27d are merged.

Formula 2

$$T_w = (V_{wr}/V_w)*T_{wout} + (1 - V_{wr}/V_w)*T_{win} \quad (2)$$

When the heat medium that exchanged heat in the use side heat exchangers 26a to 26d and the heat medium that passed through the bypasses 27a to 27d without heat exchange merge, the temperature difference between the heat media approaches the inlet temperature of the use side heat exchangers 26a to 26d by the flow amount that has been bypassed. For example, when the total flow amount is 20 L/min, the heat medium inlet temperature of the use side heat exchangers 26a to 26d 7 degrees C., the outlet temperature 13 degrees C., the flow amount flowed toward the use side heat exchangers 26a to 26d side 10 L/min, the temperature after merging becomes 10 degrees C. by formula (2).

The heat medium having the temperature after the merging returns from each indoor unit to merge and flows into the intermediate heat exchangers 15a and 15b. Then, unless the heat exchange amount of the intermediate heat exchanger 15a or 15b changes, the temperature difference between the inlet and outlet becomes almost the same through the heat exchange in the intermediate heat exchangers 15a or 15b. For example, it is assumed that the temperature difference between the inlet and outlet of the intermediate heat exchanger 15a or 15b is 6 degrees C., and at first, the inlet temperature of the intermediate heat exchanger 15a or 15b is 13 degrees C. and the outlet temperature is 7 degrees C. Further, the air-conditioning load in the use side heat exchangers 26a to 26d is lowered and the inlet temperature of the intermediate heat exchanger 15a or 15b decreases to 10 degrees C. Then, if nothing be done, since the intermediate heat exchanger 15a or 15b performs heat exchange of almost the same amount, the heat medium flows out of the intermediate heat exchanger 15a or 15b at 4 degrees C. The above is repeated and the temperature of the heat medium rapidly decreases.

In order to prevent the above, the flow amount of the heat medium flowing through the use side heat exchanger may be adjusted by changing the rotation speed of the pumps 21a and 21b according to changes in the air-conditioning load of the use side heat exchangers 26a to 26d so that the heat medium outlet temperature of the intermediate heat exchanger 15a or 15b approaches a target value. Thereby, when the air-conditioning load is lowered, the rotation speed of the pump decreases to achieve energy-saving. When the air-conditioning load increases, the rotation speed of the pump increases to cover the air-conditioning load.

The pump 21 operates when cooling load or dehumidifying load occurs in any of the use side heat exchangers 26a to 26d, and is stopped when there is neither cooling load nor dehumidifying load in any use side heat exchangers 26a to 26d. The pump 21a operates when the heating load occurs in any of the use side heat exchangers 26a to 26d, and is stopped when there is no heating load in any use side heat exchangers 26a to 26d.

Figure 8:
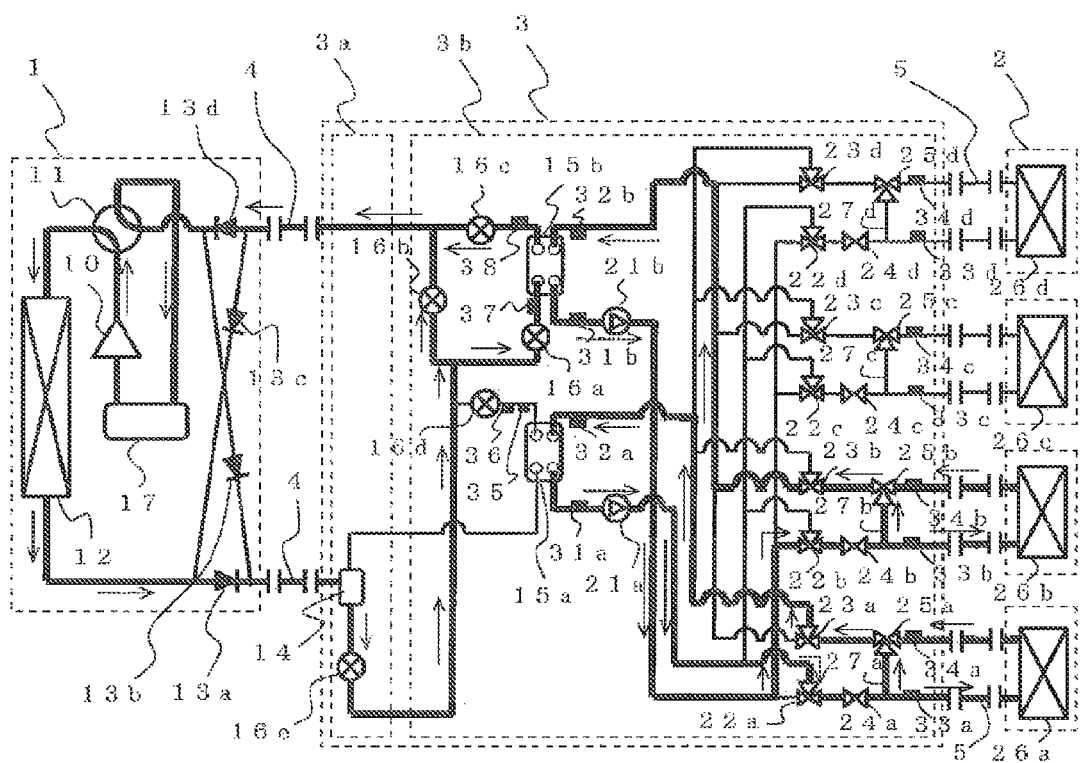
FIG. 8 is a circuit diagram showing the refrigerant and the heat medium flows at the time of defrosting operation.

In the heating only operation and the heating-main operation explained above, a low-temperature low-pressure refrigerant flows in the heat source side heat exchanger 12 and the heat source side heat exchanger 12 operates as an evaporator, therefore, a frost formation phenomenon occurs, in which frost attaches to the circumference of the heat source side heat exchanger 12. As the frost formation progresses in the heat source side heat exchanger 12, an air flow rate is lowered because heat exchange between the refrigerant and the air is disturbed and the air passage around the heat source side heat exchanger 12 is narrowed. Accordingly, heat exchange amount in the heat source side heat exchanger 12 decreases and an evaporation temperature of the refrigerant flowing inside of the heat source side heat exchanger 12 is lowered, causing deterioration in operation efficiency of the refrigeration cycle. When the frost formation further progresses, closure of air passage finally occurs. Therefore, the air-conditioning apparatus is provided with a defrosting operation function to melt the frost surrounding the heat source side heat exchanger 12. The defrosting operation function is generally performed by switching the four-way valve 11 to cooling side to send the high-temperature high-pressure refrigerant to inside of the heat source side heat exchanger 12. FIG. 8 shows the movement of the refrigerant and the heat medium during the defrosting operation.

At the time of the defrosting operation, the refrigerant behaves similarly to the cooling only operation. That is, the refrigerant is compressed by the compressor 10 to turn into a high-temperature high-pressure gas refrigerant and guided to the heat source side heat exchanger 12 via the four-way valve 11. Then, the refrigerant is condensed and liquefied there, flowed out of the heat source apparatus 1 through the check valve 13a to flow out into the relay unit 3 through the refrigerant pipeline 4. In the relay unit 3, the refrigerant enters into the gas-liquid separator 14 and passes through the expansion valves 16e and 16a to be guided into the intermediate heat exchanger 15b. Then, the refrigerant is expanded by the expansion valve 16a to turn into a low-temperature low-pressure two-phase refrigerant. The intermediate heat exchanger 15b operates as an evaporator and the refrigerant turns into a low-temperature low-pressure gas refrigerant. However, in the defrosting operation, unlike the cooling operation, since energy to melt the frost is necessary, the frequency of the compressor 10 is set at a high frequency to some degree. Therefore, since the refrigerant circulation amount and the cooling load do not match, and an excess refrigerant is generated, the opening-degree of the expansion valve 16b is controlled and the excess refrigerant is released. Then, the refrigerant passing through the expansion valve 16a and the intermediate heat exchanger 15b passes through the expansion valve 16c, merges with the refrigerant passing through the expansion valve 16b, flows out of the relay unit 3, and flows into the heat source apparatus 1 again through the refrigerant pipeline 4. In the heat source apparatus 1, the refrigerant passes through the check valve 13d to be sucked into the compressor 10 via the four-way valve 11 and the accumulator 17. Then, the expansion valve 16d is adapted to have a small opening-degree so as not to flow the refrigerant. The expansion valve 16c is made to be a full-open state so as not to generate a pressure loss.

A large amount of frost is attached around the heat source side heat exchanger 12, and at the time of melting, the frost releases latent heat at 0 degree C. to turn into water. At the time of defrosting operation, since the refrigerant performs heat exchange in the heat source side heat exchanger 12 with the frost of 0 degree C., it is cooled up to the temperature of around 0 degree C. in the heat source side heat exchanger 12 to flow out therefrom. Then, since the refrigerant flowed out of the heat source side heat exchanger 12 is cooled up to a temperature at which the refrigerant can be fully used as a cooling source, when cooling is required in the use side heat exchangers 26a to 26d, the refrigerant is made to circulate therein to be used for cooling.

Since frost formation onto the heat source side heat exchanger 12 occurs when the ambient temperature is low, there is not necessarily cooling load during the defrosting operation. When no cooling load is available, the expansion valve 16a is made to have a small opening-degree so that no refrigerant flows through the expansion valve 16a and all the refrigerant is made to flow through the expansion valve 16b.

Next, descriptions will be given to movement of the secondary side heat medium (water, anti-freezing liquid, and the like). When the cooling load is available, in intermediate heat exchanger 15b, cooling energy of the refrigerant on the primary side is transferred to the heat medium on the secondary side, and the cooled heat medium is made to flow in the secondary side piping by the pump 21b. The heat medium flowed out of the pump 21b passes through the stop valves 24a to 24d via the flow path switching valves 22a to 22d to flow into the use side heat exchangers 26a to 26d and the flow amount adjustment valves 25a to 25d. Then, through the operation of the flow amount adjustment valves 25a to 25d, only the heat medium necessary to cover the air-conditioning load required indoors is made to flow into the use side heat exchangers 26a to 26d, and the remaining passes through the bypasses 27a to 27d to make no contribution to heat exchange. The heat medium passing through the bypasses 27a to 27d merges with the heat medium passing through the use side heat exchangers 26a to 26d, passes through the flow path switching valves 23a to 23d, and flows into the intermediate heat exchanger 15b to be sucked again into the pump 21b. The air-conditioning load required indoors can be covered by controlling the flow amount adjustment valves 25a to 25d so as to keep the difference in temperature between the use side heat exchanger inlet temperatures 33a to 33d and use side heat exchanger outlet temperatures 34a to 34d to be a target value.

When the heating load is available, the heat medium in the flow path passing through the intermediate heat exchanger 15a is heated to, for example 50 degrees C. by the heating operation prior to the defrosting operation. Then, the heated heat medium is made to flow in the secondary side piping by the pump 21a. The heat medium flowed out of the pump 21a passes through the stop valves 24a to 24d via the flow path switching valves 22a to 22d to flow into the use side heat exchangers 26a to 26d and the flow amount adjustment valves 25a to 25d. Then, through the operation of the flow amount adjustment valves 25a to 25d, only the heat medium necessary to cover the heating load required indoors is made to flow into the use side heat exchangers 26a to 26d, and the remaining passes through the bypasses 27a to 27d to make no contribution to heat exchange. The heat medium passing through the bypasses 27a to 27d merges with the heat medium passing through the use side heat exchangers 26a to 26d, passes through the flow path switching valves 23a to 23d, and flows into the intermediate heat exchanger 15a to be sucked again into the pump 21b. The air-conditioning load required indoors can be covered by controlling the difference in temperature between the third temperature sensors 33a to 33d and the fourth temperature sensors 34a to 34d to maintain a predetermined target value.

During the defrosting operation, in the intermediate heat exchanger 15a, because heating energy is not supplied from the refrigerant, the temperature of the heat medium is lowered by as much as the heating load in the use side heat exchangers 26a to 26d. However, with the above-mentioned heating function during the defrosting operation being provided, the heating operation can be continued as long as the temperature of the heat medium is equal to or higher than a certain temperature to some degree, for example, 35 degrees C. Regarding the heating operation function during the defrosting operation, descriptions will be given to concrete examples.

For example, it is assumed that the temperature of the heat medium is 50 degrees C. at the start of the defrosting operation, and it is possible to perform the heating operation when equal to or higher than 35 degrees C. The flow amount of the heat medium is assumed to be 20 L per minute for each use side heat exchanger 26a to 26d. The heating load in the use side heat exchangers 26a to 26d is made to be a value that can just be covered by making the temperature difference of the heat medium at the outlet and inlet of each use side heat exchanger 26a to 26d to be 5 degrees C. During the heating operation prior to the start of defrosting, heat amount is assumed to have been supplied that can give 5 degrees C. temperature difference at the outlet and inlet of the intermediate heat exchanger 15a under the above conditions. The piping in which the heat medium circulates is assumed to have a length for the refrigerant to take a round in one minute. When the defrosting operation starts under these conditions, there will be no heating amount in the intermediate heat exchanger 15a, therefore, the outlet temperature of the intermediate heat exchanger 15a decreases 5 degrees C. in one minute. Accordingly, it is possible to continue heating operation until the heat medium whose initial temperature is 50 degrees C. becomes 35 degrees C., that is, until the temperature of the heat medium drops by 15 degrees C., therefore, heating operation can be continued for three minutes in total. Usually, three minutes is enough to complete the defrosting operation. That is, it is possible to cover heating during the defrosting operation only by the circulation of the refrigerant on the secondary side. Even if the defrosting operation is further extended, the time in which heating energy can not be supplied to indoors is the time obtained by subtracting the time in which heating is performed only by circulation of the heat medium from the time of the defrosting operation. Therefore, decrease in the room temperature can be drastically made small during the time of the defrosting operation.

When needing to continue heating longer even if the heating capacity is lowered a little, the flow amount of the heat medium has only to be lowered by decreasing the rotation speed of the pump 21a to less than the operation condition prior to the start of the defrosting operation. For example, if the rotation speed is halved of the time when the defrosting operation started, heating operation can be continued for twice the time. Thus, time to stop the heating operation during the defrosting operation can be shortened, improving the comfort of indoors compared with the case of no heating operation.

When the detection temperature of at least either a first temperature sensor 31a or a second temperature sensor 32a that detects the temperature of the entrance or the exit of the intermediate heat exchanger 15a becomes equal to or lower than a predetermined set temperature, the pump 21a may reduce the operation capacity or stop the operation. The above-mentioned set temperature is a lower limit temperature (a heating limit temperature) at which heating operation is possible, therefore, it may be suitably determined, for example, may be 30 to 35 degrees C. The control may be performed by installing a temperature sensor at the inlet side or the outlet side of the pump 21a to utilize the detected temperature.

In addition, it is conceivable that during the defrosting operation, the use side heat exchanger in operation undergoes thermo-off to stop or undergoes thermo-on to start. Therefore, in order to make the load to be corresponded more appropriately, a discharge capacity of the pump 21a may be determined according to the required heating capacity of the use side heat exchanger at that time. The required heating capacity of the use side heat exchanger can be calculated by installing a flow meter that measures the flow amount of the heat medium flowing through the use side heat exchanger and measuring the flow amount of the heat medium based on the above-mentioned formula (1). It may be determined based on a capacity code representing the heat exchange capacity of each use side heat exchanger. Further, when the capacity of each use side heat exchanger does not differ so much from each other, it may be determined roughly by the number of units in operation of the use side heat exchangers.

During the defrosting operation, since there is no need to flow the heat medium to the use side heat exchanger (including thermo-off) having no air-conditioning load, the flow path is closed by the stop valves 24a to 24d so as not to flow the heat medium to the use side heat exchanger. FIG. 8 shows a case where the use side heat exchanger 26a has a heating load and the use side heat exchanger 26b has a cooling load, and the use side heat exchangers 26c and 26d have no air-conditioning load and the corresponding stop valves 24c and 24d are closed.

Figure 9:
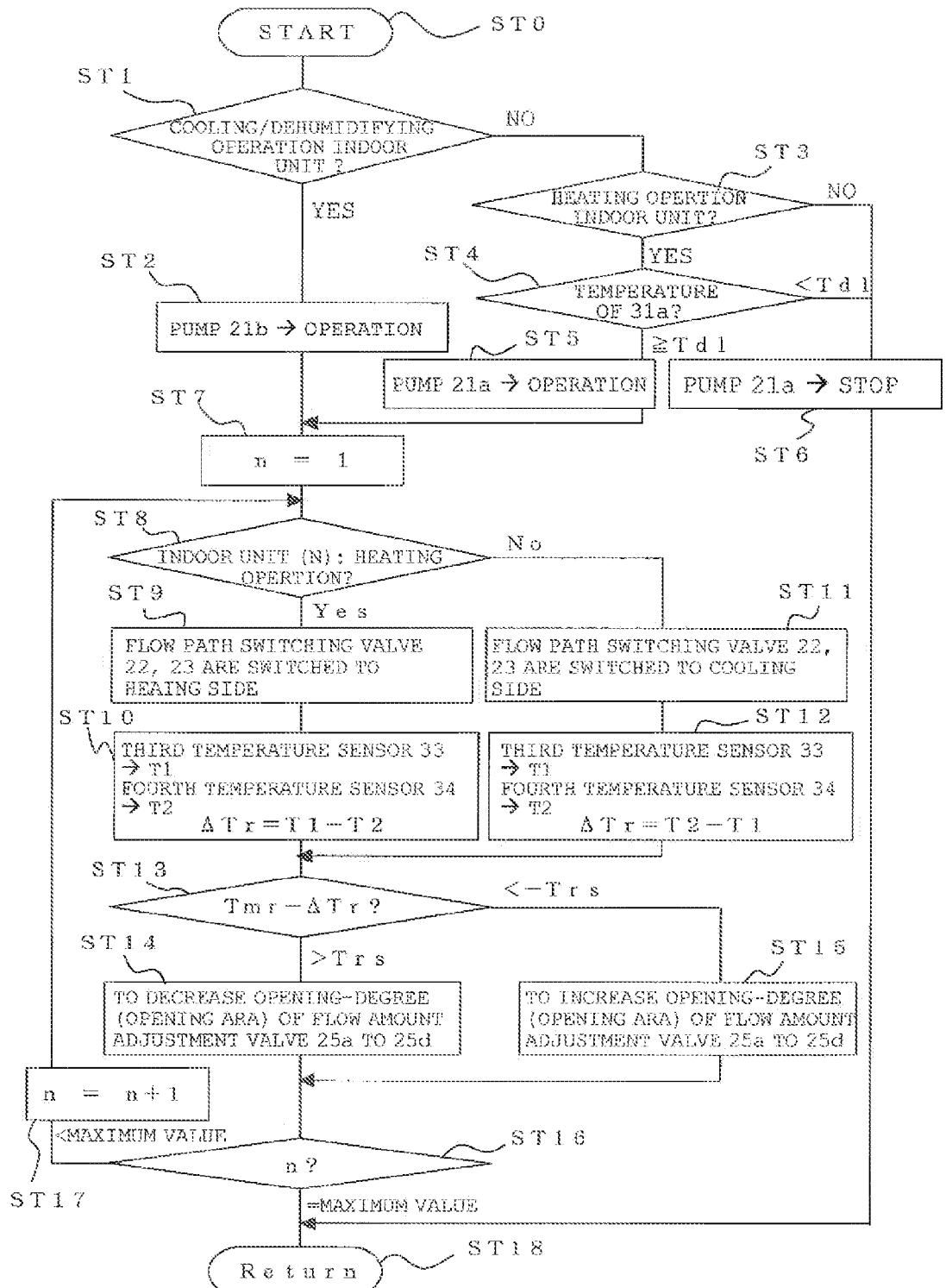
FIG. 9 is a flow chart illustrating flow amount control operation of the heat medium by a controller of the air-conditioning apparatus.

Next, descriptions will be given to the flow amount control operation of the heat medium by the controller 300 based on the flow chart of FIG. 9. Here, it will be explained the flow path switching valves 22a to 22d as a flow path switching valve 22 and with the flow path switching valves 23a to 23d being the flow path switching valve 23.

When the controller starts processing (ST0), the presence/absence of the indoor unit is determined (ST1, ST3) that performs cooling (or dehumidifying) operation or heating operation. When there is an indoor unit that performs cooling (or dehumidifying) operation, the pump 21b on the cooling side is operated (ST2). When there is an indoor unit that performs heating, the temperature of the heat medium is checked to be equal to or higher than a predetermined heating limit temperature (s4) and the pump 21a on the heating side is operated (ST5). Then, regarding the relevant indoor units, states of all the indoor units are checked from number 1 in order (ST7, ST16, ST17). The "n" in the figure denotes a number of the indoor unit. When the indoor unit performs heating operation (ST8), the flow path switching valves 22 and 23 corresponding to the indoor unit are switched to the intermediate heat exchanger 15a for heating (ST9), the detection temperature T1 of the third temperature sensors 33a to 33d and the detection temperature T2 of the fourth temperature sensors 34a to 34d are obtained, and the value obtained by subtracting T2 from T1 is set to be a Δ Tr (ST10). On the other hand, when the indoor unit performs cooling operation, the flow path switching valves 22 and 23 corresponding to the indoor unit are switched to the intermediate heat exchanger 15b for cooling (ST11), the detection temperature T1 of the third temperature sensors 33a to 33d and the detection temperature T2 of the fourth temperature sensors 34a to 34d are obtained, and the value obtained by subtracting T1 from T2 is set to be a Δ Tr (ST12). When the difference in temperature between a control target value Tmr and Δ Tr is larger than a safety region Trs, opening-degree (opening area) of the corresponding flow amount adjustment valves 25a to 25d is reduced (ST13, ST14), and when the difference in temperature between the control target value Tmr and Δ Tr is smaller than a safe region Trs, the opening-degree (opening area) of the corresponding flow amount adjustment valves 25a to 25d is increased (ST13, ST15). Δ Tr is controlled to come closer to the control target value and each heating load and cooling load is covered.

Trs may be set at 0 degree C. and no safety region may be provided. However, when the safety region is provided, the number of controlling the flow amount adjustment valves 25a to 25d is reduced and a valve life will be prolonged.

During the defrosting operation, cooling energy is supplied from the refrigerant to the intermediate heat exchanger 15b, however, heating energy is not supplied from the refrigerant to the intermediate heat exchanger 15a. Therefore, when the detection temperature of the first temperature sensor 31a at the inlet of the pump 21a becomes lower than a set heating limit temperature Tdl, for example 35 degrees C., the pump 21a is stopped (ST4, ST6). When the pump 21a is stopped, heating operation is stopped, as well. In place of stopping the pump 21a, its operation capacity may be reduced.

These procedures are repeated for each predetermined time period. Here, in the case of the control target being 5 degrees C. and safety region being 1 degree C., for example, when the temperature difference between the inlet and outlet of the use side heat exchanger Δ Tr is 3 degrees C., the opening-degree (opening area) of the flow amount adjustment valves 25a to 25d are controlled so that the flow amount flowing through the use side heat exchangers 26a to 26d is reduced. On the other hand, if the temperature difference between the inlet and outlet of the use side heat exchanger ΔTr is 7 degrees C., the opening-degree (opening area) of the flow amount adjustment valves 25a to 25d are controlled so that the flow amount flowing through the use side heat exchangers 26a to 26d increases. Then, through the above-mentioned operations, the temperature difference between the inlet and outlet of the use side heat exchanger ΔTr is made to approach the control target. During the heating operation, when the inlet or the outlet temperature of the pump 21a is 45 degrees C. at the time of the start of heating, if the temperature turns into a predetermined heating limit temperature, 35 degrees C. for example, the pump 21a is made to be stopped or its operation capacity is decreased.

The heating limit temperature for stopping the heating operation by the circulation of the heat medium during the defrosting operation can be detected by using any of the detection temperature of the first temperature sensor 31*a*, the second temperature sensor 32*a*, the third temperature sensors 33*a* to 33*d*, and the fourth temperature sensors 34*a* to 34*d*, in addition to the inlet or outlet temperature of the pump 21*a*. However, since the detection temperature of the fourth temperature sensors 34*a* to 34*d* changes according to the control, it is more preferable to use the other three detection temperatures.

Embodiment 2

Figure 10:
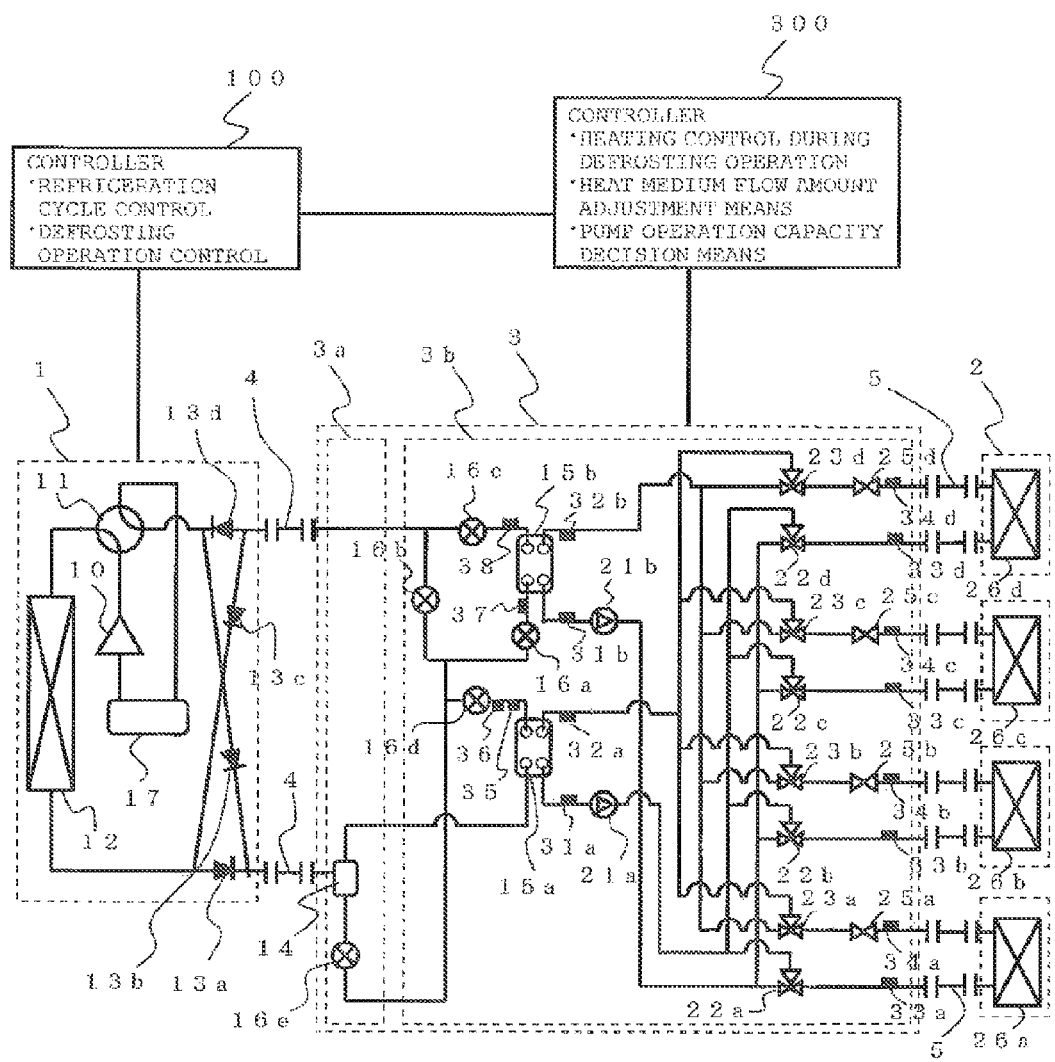
FIG. 10 is a circuit diagram for the refrigerant and the heat medium of the air-conditioning apparatus according to Embodiment 2 of the present invention.

FIG. 10 is a circuit diagram for the refrigerant and the heat medium of the air-conditioning apparatus according to Embodiment 2 of the present invention. The air-conditioning apparatus according to Embodiment 2 is the same as that of Embodiment 1 except that a two-way flow amount adjustment valve is employed as the flow amount adjustment valves 25*a* to 25*d* and that the stop valves 24*a* to 24*d* are omitted. The two-way flow amount adjustment valve is employed that can continuously change the opening-degree using a stepping motor and the like. Control of the two-way flow amount adjustment valve is similar to the case of the three-way flow amount adjustment valve. By adjusting the opening-degree of the two-way flow amount adjustment valve, the flow amount flowed into the use side heat exchangers 26*a* to 26*d* is controlled such that the temperature difference between before and after the use side heat exchangers 26*a* to 26*d* becomes 5 degrees C., for example. Thereafter, the rotation speed of the pumps 21*a* and 21*b* is controlled so that the temperature of the inlet side or the outlet side of the intermediate heat exchangers 15*a* and 15*b* becomes the target value. When employing the two-way flow amount adjustment valve as the flow amount adjustment valves 25*a* to 25*d*, since it can be used for opening and closing the flow path, the stop valves 24*a* to 24*d* become unnecessary, yielding a merit that the system can be constructed at low cost.

In Embodiments 1 and 2, descriptions are given to the case where both the first temperature sensors 31*a* and 31*b* and the second temperature sensors 32*a* and 32*b* are installed, however, in order to control the pumps 21*a* and 21*b*, either of the first temperature sensors 31*a* and 31*b* or the second temperature sensors 32*a* and 32*b* may be enough. During the defrosting operation, since heating energy is not supplied within the intermediate heat exchanger 15*a*, the heat medium inlet temperature and the heat medium outlet temperature of the intermediate heat exchanger 15*a* becomes almost the same.

As for the refrigerant, a single refrigerant such as R-22 and R-134a, pseudo-azeotropic mixture refrigerant such as R-41 OA and R-404A, azeotropic mixture refrigerant such as R-407C, the refrigerant or its mixture that is regarded to have a smaller global warming potential such as $CF_3CF=CH_2$ including a double bond in the chemical formula, or a natural refrigerant such as $CO_2$ and propane, can be utilized.

The refrigerant circuit is configured to contain an accumulator 17, however, the present invention is effective without it. Descriptions are given to the case where there are the check valves 13*a* to 13*d*, however, these are not indispensable for the present invention. Without them, the present invention can be constituted and its working effect can be achieved.

A fan should be attached to the heat source side heat exchanger 12 and the use side heat exchangers 26*a* to 26*d* and it is preferable to promote condensation and evaporation by blowing. It is not limited thereto, however, but as for the use side heat exchangers 26*a* to 26*d*, a panel heater utilizing radiation may be employed. As for the heat source side heat exchanger 12, a water-cooled type may be employed that moves heat by water and anti-freezing liquid. Any type is allowable having a structure that can release or absorb heat.

Descriptions are given to the case where there are four use side heat exchangers 26*a* to 26*d*, however, at least one may be allowable for the present invention. There is no limit for the number of units.

Descriptions are given to the case where the flow path switching valves 22*a* to 22*d* and 23*a* to 23*d*, the stop valves 24*a* to 24*d*, and the flow amount adjustment valves 25*a* to 25*d* are connected with the use side heat exchangers 26*a* to 26*d* on a one-by-one basis, however, it is not limited thereto. Each use side heat exchanger may be connected with a plurality of them. Thereby, the plurality of them connected to the same use side heat exchanger may be operated in the same way.

Descriptions are given to the case where there are two intermediate heat exchangers 15*a* and 15*b*, however, it is not limited thereto. The number of the intermediate heat exchanger can be increased according to the number of indoor units.

Descriptions are given to the case where the flow amount adjustment valves 25*a* to 25*d*, the third temperature sensors 33*a* to 33*d*, and the fourth temperature sensors 34*a* to 34*d* are installed in the relay unit 3, however, it is not limited thereto. The same operation and effect may be obtained by installing them inside or near the indoor unit 2. When employing a two-way flow amount adjustment valve for the flow amount adjustment valves 25*a* to 25*d*, the third temperature sensors 33*a* to 33*d* and the fourth temperature sensors 34*a* to 34*d* may be installed inside or near the relay unit 3, and the flow amount adjustment valves 25*a* to 25*d* may be installed inside or near the indoor unit 2.

The air-conditioning apparatus according to the present embodiment explained above can cover the heating load by circulating the warm heat medium on the secondary side during the defrost operation to suppress the lowering of the room temperature. By allowing the relay unit 3 to be separately formed from the use side heat exchangers 26*a* to 26*d* and the heat source side heat exchanger 12 and installed at a separate position from each other, the pump power can be made small for transferring the heat medium so as to improve the system efficiency including defrosting. Accordingly, operation having high energy-saving property can be performed.

The invention claimed is:

1. An air-conditioning apparatus, comprising:
   an intermediate heat exchanger for heating a heat medium and an intermediate heat exchanger for cooling a heat medium, each intermediate heat exchanger exchanging heat between a refrigerant and the heat medium different from the refrigerant;
   a refrigerating cycle in which a compressor, a flow path switching valve that switches an outlet side flow path of the compressor between at a time of heating and at a time of cooling, a heat source side heat exchanger, at least one expansion valve, and at least one of refrigerant side flow paths of the intermediate heat exchanger for heating the heat medium and the intermediate heat exchanger for cooling the heat medium are connected via piping through which the refrigerant flows;
   a heat medium circulation circuit in which at least one of heat medium side flow paths of the intermediate heat exchanger for heating the heat medium and the intermediate heat exchanger for cooling the heat medium, a pump corresponding to the intermediate heat exchanger for heating the heat medium and a pump corresponding to the intermediate heat exchanger for cooling the heat medium, and a plurality of use side heat exchangers connectable to the respective intermediate heat exchangers are connected via piping through which the heat medium flows; and at least one controller that controls a defrosting operation, the defrosting operation introducing a high temperature and high pressure refrigerant discharged from the compressor into the heat source side heat exchanger by switching the flow path switching valve to a cooling side and melting frost surrounding the heat source side heat exchanger, wherein the heat source side heat exchanger, the intermediate heat exchanger for heating the heat medium and the intermediate heat exchanger for cooling the heat medium, and the use side heat exchangers are formed in a separate body and adapted to be installed at separate locations, and the at least one controller is configured to be capable of performing simultaneously a cooling operation during the defrosting operation to circulate the heat medium between the use side heat exchanger in need of cooling and the intermediate heat exchanger for cooling the heat medium by driving the pump corresponding to the intermediate heat exchanger for cooling the heat medium, and a heating operation during the defrosting operation to circulate the heat medium having heating energy in the intermediate heat exchanger for heating the heat medium in heat medium circulation circuit including the intermediate heat exchanger for heating the heat medium between the use side heat exchanger in need of heating and the intermediate heat exchanger for heating the heat medium by driving the pump corresponding to the intermediate heat exchanger for heating the heat medium.

2. The air-conditioning apparatus of claim 1, wherein
the at least one controller determines operation capacity of the pump corresponding to the intermediate heat exchanger for heating the heat medium according to a total of capacity codes of the use side heat exchangers performing heating operation, a total of units, or a total value of required heating capacity.

3. The air-conditioning apparatus of claim 1, wherein
a flow amount adjustment valve is disposed that adjusts a flow amount of the heat medium at an inlet side flow path or an outlet side flow path of each of the use side heat exchangers, temperature sensors are disposed that detect temperatures of the heat medium flowing into the use side heat exchangers and temperatures of the heat medium flowing out from the use side heat exchangers, and the flow amount of the flow amount adjustment valve is adjusted by the at least one controller so that a difference between detection temperature of the temperature sensors is made to approach a predetermined target value.

4. The air-conditioning apparatus of claim 3, wherein
when the detection temperature of at least either of the temperature sensors becomes equal to or lower than a predetermined heating limit temperature, the at least one controller controls the pump corresponding to the intermediate heat exchanger for heating the heat medium to decrease operation capacity or to stop operation.

5. The air-conditioning apparatus of claim 1, wherein
temperature sensors are disposed that detect temperature of the heat medium at the inlet side or the outlet side of the intermediate heat exchanger for heating the heat medium or at the inlet side or the outlet side of the pump corresponding to the intermediate heat exchanger for heating the heat medium, and when the detection temperature of any of the temperature sensors becomes equal to or lower than a predetermined heating limit temperature, the at least one controller controls the pump corresponding to the intermediate heat exchanger for heating the heat medium to decrease operation capacity or to stop operation.

6. The air-conditioning apparatus of claim 1, wherein
the operation capacity of the pump corresponding to the intermediate heat exchanger for heating the heat medium the during defrosting operation is set at a smaller value than the operation capacity prior to the defrosting operation.

7. The air-conditioning apparatus of claim 1, wherein
the intermediate heat exchanger for heating the heat medium and the intermediate heat exchanger for cooling the heat medium are installed outside of a space or spaces subjected to air-conditioning of the use side heat exchangers.

* * * * *